US010995730B2

(12) United States Patent
Harms et al.

(10) Patent No.: US 10,995,730 B2
(45) Date of Patent: May 4, 2021

(54) METHOD FOR CONTROLLING A WIND TURBINE

(71) Applicant: Wobben Properties GmbH, Aurich (DE)

(72) Inventors: Harro Harms, Wiesmoor (DE); Constantin Bergemann, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/469,579

(22) PCT Filed: Dec. 15, 2017

(86) PCT No.: PCT/EP2017/082946
§ 371 (c)(1),
(2) Date: Jun. 13, 2019

(87) PCT Pub. No.: WO2018/109141
PCT Pub. Date: Jun. 21, 2018

(65) Prior Publication Data
US 2019/0390650 A1 Dec. 26, 2019

(30) Foreign Application Priority Data

Dec. 16, 2016 (DE) ..................... 10 2016 124 630.1

(51) Int. Cl.
*F03D 7/02* (2006.01)
*G05B 17/02* (2006.01)
*F03D 7/00* (2006.01)

(52) U.S. Cl.
CPC .......... *F03D 7/0204* (2013.01); *F03D 7/0224* (2013.01); *F03D 7/0268* (2013.01);
(Continued)

(58) Field of Classification Search
CPC .... F03D 7/0224; F03D 7/0204; F03D 1/0675; F03D 7/048; F03D 1/0658; F03D 7/024;
(Continued)

(56) References Cited

U.S. PATENT DOCUMENTS 9,371,819 B2   6/2016  Grabau
2010/0301605 A1  12/2010  Nielsen et al.
(Continued)

FOREIGN PATENT DOCUMENTS

CN   101535636 A   9/2009
CN   101878365 A   11/2010
(Continued)

OTHER PUBLICATIONS

Eungsoo Kim et al., "Hurricane-Induced Loads on Offshore Wind Turbines with Considerations for Nacelle Yaw and Blade Pitch Control", Wind Engineering, vol. 38, No. 4, 2014, pp. 413-423.

*Primary Examiner* — Michael J Brown
(74) *Attorney, Agent, or Firm* — Seed Intellectual Property Law Group LLP

(57) ABSTRACT

A method for operating a wind turbine, and the wind turbine has an aerodynamic rotor with a rotor hub and with rotor blades of which the blade angle can be adjusted, and the aerodynamic rotor can be adjusted in respect of its azimuth direction, and the method comprises the steps of detecting a storm situation in which the prevailing wind is so strong that the wind turbine is moved to a coasting mode for self-protection purposes, orienting the rotor in respect of its azimuth position into a low-loading orientation in relation to the wind, in which orientation the wind turbine is subjected to as little loading as possible by the wind from a main wind direction, detecting at least one loading ($L_M$) which is caused by a gust of wind and acts on the rotor, and adjusting at least one of the rotor blades in respect of its blade angle
(Continued)

such that the at least one rotor blade is subjected to as little loading as possible by the causative gust of wind.

13 Claims, 2 Drawing Sheets

(52) U.S. Cl.
CPC ....... *F05B 2260/74* (2013.01); *F05B 2260/76* (2013.01); *F05B 2270/328* (2013.01); *F05B 2270/329* (2013.01)

(58) Field of Classification Search
CPC ........ F03D 7/0264; F03D 7/0276; F03D 1/06; F03D 1/0633; F03D 7/00; F03D 7/0288; F03D 3/06; F03D 7/022; G05B 17/02; G05B 23/0254; G05B 23/0286; F05B 2260/74; F05B 2260/76; F05B 2270/328; F05B 2270/329; F05B 2270/322; F05B 2270/331; Y02E 10/72
USPC .................................................. 700/287, 291
See application file for complete search history.

(56) References Cited

U.S. PATENT DOCUMENTS

| | | |
|---|---|---|
| 2012/0139240 A1 | 6/2012 | Otamendi Claramunt et al. |
| 2013/0129508 A1 | 5/2013 | Spruce |
| 2014/0010651 A1 | 1/2014 | Nies |
| 2016/0305402 A1* | 10/2016 | Caponetti .............. H02K 7/183 |
| 2017/0321652 A1 | 11/2017 | Beekmann et al. |

FOREIGN PATENT DOCUMENTS

| | | |
|---|---|---|
| CN | 102493918 A | 6/2012 |
| CN | 102933841 A | 2/2013 |
| CN | 103541862 A | 1/2014 |
| CN | 103742357 A | 4/2014 |
| DE | 102014223640 A1 | 5/2016 |
| EP | 2685095 A2 | 1/2014 |
| JP | 2004536247 A | 12/2004 |
| JP | 2007064062 A | 3/2007 |
| JP | 2017534803 A | 11/2017 |
| JP | 2006016984 A | 1/2019 |
| RU | 49137 U1 | 11/2005 |
| WO | 2015/014366 A1 | 2/2015 |

* cited by examiner

METHOD FOR CONTROLLING A WIND TURBINE

BACKGROUND

Technical Field

The present invention relates to a method for controlling a wind turbine. Said invention also relates to a method for designing a wind turbine. Said invention also relates to a wind turbine.

Description of the Related Art

Wind turbines are known and the present invention relates particularly to conventional so-called horizontal-axis wind turbines in which an aerodynamic rotor with at least one, usually three, rotor blades rotates about a substantially horizontal rotor axis. During operation of the wind turbine, said wind turbine is oriented in relation to the wind by way of its rotor or accordingly by way of the rotor axis. Therefore, said wind turbine is oriented with its azimuth position into the wind. A wind turbine in which the blade angle of each of the rotor blades can be adjusted is also taken as a basis. In this case, the rotor blades are adjusted about their longitudinal axis in order to match their position to the respective operating conditions.

When the wind turbine is not in operation, at least no current is being generated, the rotor blades are usually rotated into a feathered position in order to provide, particularly in a storm situation, as little attack surface as possible for a storm of said kind in this way. In this case, a feathered position is one in which the rotor blades are rotated substantially through 90 degrees in relation to an operating position in the partial-load mode. In simple terms, they are then approximately parallel in relation to the wind, at least in each case in one section of each rotor blade.

It should be noted here that the direction from which a storm of said kind can arise is generally not known beforehand and therefore a high loading can nevertheless occur in spite of a feathered position in the event of an unfavorable wind direction of a storm of said kind. In order to address this, provision may be made for the wind turbine in respect of its azimuth direction to also be oriented into the wind when it is not in operation, that is to say when it is not actively generating current.

However, an adjustment of the azimuth position of this kind can still lead to high loading of the wind turbine depending on how a storm occurs. It may be particularly problematical when different wind directions occur during a storm, so that so-called oblique incident flows occur.

The German Patent and Trade Mark Office has searched the following prior art in the priority application of the present application: DE 10 2014 223 640 A1, US 2014/0010651 A1 and the article "Hurricane-Induced Loads on Offshore Wind Turbines with Considerations for Nacelle Yaw and Blade Pitch Control" by E. Kim et al., Wind Engineering, Volume 38, 2014, pages 413-423.

BRIEF SUMMARY

Provided are a wind turbine and a method of protecting a wind turbine against mechanical loading in a storm situation.

Provided is a method for controlling a wind turbine. Here, control is not intended to be understood in a strict sense of control theory but rather in the sense of a turbine controller which can control different turbine parts, this including feedback of information.

The method therefore proceeds from a wind turbine which has an aerodynamic rotor with rotor blades of which the blade angle can be adjusted. Adjustment of this kind of a blade angle of a rotor blade is also called pitching.

The aerodynamic rotor can also be adjusted in respect of its azimuth direction, this usually being able to be performed by the entire nacelle on which the aerodynamic rotor is installed being adjusted in respect of its azimuth direction, that is to say in respect of its orientation in relation to the wind.

The method initially proposes detecting a storm situation. Here, a storm situation is present when the prevailing wind is so strong that the wind turbine is moved to a coasting mode for self-protection purposes. Therefore, the wind turbine no longer generates any current and the rotor is able to rotate freely. However, in this case, the rotor blades are set such that the aerodynamic rotor, which is merely called the rotor here for reasons of simplicity, is not driven by the wind in a targeted manner. However, in particular, the rotor is not fixed either.

In addition, at least one loading which acts on the rotor due to a gust of wind is detected. In particular, this can be done by measuring a loading on each rotor blade such as, for example, in a root region of each rotor blade. For reasons of simplicity, each loading detected here can be considered to be a loading which acts on the rotor due to a gust of wind and can be further processed provided that the described method for controlling the wind turbine is activated. However, a loading level as a limit value can also be taken as a basis in order to identify a loading which acts on the rotor due to a gust of wind or in order to consider said loading as such and accordingly to further process said loading.

The method includes adjusting, that is to say pitching, at least one of the rotor blades in respect of its blade angle, wherein this is done such that the at least one rotor blade is subjected to as little loading as possible by the detected loading.

It is particularly possible here that a loading on a rotor blade is detected in terms of magnitude and direction and the rotor blade is rotated out of this gust of wind completely or at least partially. This can also be explained such that the rotor blade is rotated into an individual feathered position with respect to said gust of wind, the loading of which was detected. In particular, this can also mean that the rotor blade is rotated beyond a feathered position with respect to the main wind direction, which can be called the main feathered position for better distinguishability here, depending on the direction from which said gust of wind is arriving. If said main feathered position has, for example, a value of 90 degrees with respect to the main wind direction, the method includes rotating the blade beyond said 90 degrees to a higher value or rotating said blade to a lower value than said 90 degrees depending on the loading direction, to stay with this example.

Therefore, it has also been identified, in particular, that a gust of wind does not necessarily have to arrive from the main wind direction, but rather can form an oblique incident flow on the rotor. In this case, the main feathered position of the rotor blades in relation to the main wind direction when the wind turbine in respect of its azimuth position is oriented in the main wind direction is not an individual feathered position in respect of a gust of wind arriving from a different direction. This is taken into account by the proposed adjustment of the rotor blade. The orientation of the rotor in its azimuth position, that is to say its azimuth orientation, can be maintained in this case.

The at least one rotor blade is preferably adjusted depending on a detected blade loading, wherein the detected blade loading is entered into a load control arrangement and the load control arrangement adjusts the angle of the rotor blade in question, depending on the detected loading, such that the loading is minimized. Therefore, a control arrangement or control loop is proposed here which performs the blade adjustment depending on the loading. A setpoint value/actual value comparison of the loading can be performed for this purpose. In this case, the setpoint value of the loading is preferably the value 0. In this case, the detected loading can also be taken into account with a mathematical sign. To this end, it is possible to define, from amongst two possible loading directions, as positive loading and the other as negative loading and the positive loading can then lead to an adjustment of the rotor blade in one direction and a negative loading can lead to an adjustment of the rotor blade in an opposite direction.

The loading detection used here can correspond to the detection of the loading which is caused due to the gust of wind.

To this end, the method preferably proposes using a PI controller. Said PI controller can be provided such that the described setpoint value/actual value comparison between the setpoint loading and the actual loading is passed to a PI element which supplies a setpoint angle as the output value. This setpoint angle can identify, for example, a deviation from a feathered position, so that the value 0 therefore corresponds to the feathered position, specifically the main feathered position. When the loading setpoint value is 0, the detected loading can also be passed directly to the PI element.

According to one embodiment, a PD controller is provided for the or as the load control arrangement. A rapid response to a rapidly occurring and rapidly changing loading can be achieved by a PD controller of this kind and it has been identified that rapidly occurring and rapidly changing loadings can be expected in particular. It has also been identified that the wind is constantly changing in the storm situation taken as a basis and therefore designing a controller for stationary accuracy is not strictly necessary.

When orienting the rotor into the low-loading orientation in relation to the wind, the rotor blades are moved to a feathered position and, starting from this position, each rotor blade is individually adjusted in respect of its blade angle about an angle deviation in relation to the feathered position. The feathered position, which relates to the main wind direction, is the starting position for the load-reducing angle adjustment. The proposed adjustment can also relate to this feathered position, that is to say the main feathered position, and corresponding actuating variables can be prespecified or defined with respect to this feathered position.

One embodiment proposes that at least one load sensor is provided for each rotor blade. Said load sensor can be, for example, a strain gauge to mention just one example. Said at least one load sensor can be provided on the rotor blade, particularly in the region of the blade root of the rotor blade, or in the region of a fastening of the rotor blade to the rotor hub. By way of example, it is possible that the rotor blade is fastened to the rotor hub by means of a blade adapter. In this case, the load sensor can also be arranged on the blade adapter or at a transition from the rotor blade to the blade adapter or in a transition region from the rotor blade or from the blade adapter to the hub. In any event, said load sensor is provided for individually detecting loading of the rotor blade in question.

Said load sensor generates a load signal which is fed back to a control apparatus of the rotor blade. Therefore, a control apparatus is provided for each rotor blade or, in the case of a central control apparatus, individual control-related account is taken at least for each individual rotor blade. Said feedback of the load signal to the control apparatus is intended to be used in order to carry out the adjustment of the rotor blade depending on said load signal in order to minimize or at least to reduce a loading which is detected by said load signal. Therefore, individual control of each rotor blade is based on the load signal of each individual rotor blade. Therefore, a load-relieving mode can be individually implemented for each rotor blade in a particularly effective manner.

A signal transmission device is preferably provided for this purpose, which signal transmission device transmits a load signal of said kind from the load sensor to the control apparatus. A signal transmission device of this kind is preferably provided for each rotor blade and said signal transmission devices can be cabled and/or provide data transmission without a cable.

A dedicated control apparatus is preferably provided for each rotor blade and said control apparatus is preferably arranged adjacent to a blade adjustment device for adjusting the rotor blade. Therefore, a loading can be detected and passed to the control apparatus of the rotor blade in question for each individual rotor blade using the load sensor. The control apparatus can actuate the blade adjustment device depending on said loading, specifically in particular such that the loading which is detected by the load sensor is minimized, at least reduced.

One embodiment proposes that the adjustment of the at least one rotor blade in respect of its blade angle is first performed when the causative gust of wind for the detected loading acting on the rotor due to the gust of wind fulfils at least one of the following criteria, specifically that the causative gust of wind has a wind speed which lies above a predetermined limit gust of wind speed, that the causative gust of wind has a wind speed which lies above an average wind speed of the prevailing wind at least by a predetermined wind speed difference, and/or that the causative gust of wind has a gust of wind direction which deviates from the main wind direction in respect of magnitude at least by a predetermined wind direction difference.

Therefore, an adjustment of the at least one rotor blade is not carried out in every case, but rather only when there are particularly strong gusts of wind and/or when there are gusts of wind with a direction which differs greatly from the main wind direction. The strength of the gust of wind can also be detected by means of load detection of a load particularly on the rotor blade.

To this end, according to one aspect, a predetermined limit gust of wind speed can be taken as a basis. If said limit gust of wind speed is exceeded, the adjustment is initiated. In addition or as an alternative, a predetermined wind speed difference as a criterion can also be taken as a basis. In this case, it is not an absolute speed of the gust of wind that is checked but rather how strongly or to what extent said gust of wind exceeds the average wind speed of the prevailing wind. Here, a 10-minute average of the detected wind speed can be taken as a basis for example. In this way, a degree of fluctuation in the wind speed is taken into account in principle. It is also possible for both criteria to be checked and taken as a basis at the same time by way of, for example, an adjustment being performed only when the limit gust of wind speed and the wind speed difference are exceeded. However, in this case, it may be expedient to define the limit gust of wind speed and/or the wind speed difference at a lower value in each case.

A further aspect proposes checking the extent of the deviation in the gust of wind direction from the main wind direction. To this end, the predetermined wind direction difference is taken as a basis. This makes use of the knowledge that a particularly large deviation from the main wind direction as a so-called oblique incident flow can be particularly dangerous, at least particularly burdensome. This aspect can also be combined with the two aspects mentioned above. One possibility is that all criteria are satisfied at the same time, wherein the corresponding predetermined limit values are preferably accordingly adapted, that is to say reduced. It is also possible to add up the gust of wind speed and/or the gust of wind speed which exceeds the average wind speed and/or the gust of wind direction, in each case provided with a weighting factor, and to compare them with a common criterion as a limit. Said common criterion can then accordingly be a sum of the predetermined limit gust of wind speed, the predetermined wind speed difference and/or the predetermined wind direction difference, in each case multiplied by a weighting factor. The weighting factors can also each take into account the different physical units, specifically wind speed on the one hand and wind direction on the other hand.

The detection of the gust of wind and its wind speed and also the gust of wind direction particularly for checking whether an adjustment of the at least one rotor blade should be performed can also be performed based on a loading measurement on at least one rotor blade. The operating control arrangement fundamentally knows the orientation of the rotor in the azimuth position and also the respectively set blade angle. In addition, the respective position of the rotor in its own rotation direction is also known. In other words, the position in which each of the rotor blades are situated, specifically with respect to the rotation of the rotor about the rotor axis, is therefore known. Using this information, the wind speed and the wind direction in the region of the rotor blade can also be estimated from a loading on the rotor blade. Therefore, said criteria for the gust of wind can also be estimated therefrom.

Moreover, said criteria starting from which an adjustment of the rotor blade is intended to be performed are minimum criteria which are intended to immediately lead to an adjustment of the rotor blade when they are exceeded. In other words, it is not necessarily a matter of initially measuring the gust of wind in question but rather only of establishing whether a threshold is exceeded. If this threshold is exceeded, the adjustment of the rotor blade is initiated and thereafter the gust of wind can also increase still further in respect of its wind speed.

In particular, the activation of a load-relieving mode described above or below is also possible for a power outage in which the wind turbine can suddenly no longer feed electrical power into the electrical supply grid and therefore is operated in a coasting mode. Particularly for this instance, the invention proposes not activating the load-relieving mode in every case since, particularly in this case, it is also possible that a storm situation is not present at all and therefore extreme loads are not to be expected.

The low-loading orientation of the rotor in its azimuth position is preferably an orientation which points in the main wind direction. Accordingly, the wind turbine in respect of its azimuth position is therefore oriented in the main wind direction wherever possible. Here, the main wind direction can be taken into account, for example, with a lasting average value so that, in the event of a gust of wind with an oblique incident flow which lasts about 10 or 20 seconds, updating of the azimuth position is not performed or is carried out at least with a delay, that is to say does not have to be carried out at the maximum possible adjustment speed for the azimuth adjustment and/or does not have to be carried out immediately.

The gust of wind is preferably detected in respect of wind speed and wind direction. It may be advantageous for the described loading-dependent adjustment of the at least one rotor blade in the coasting mode to only be activated at all when at least a strong gust of wind has occurred. In this respect, a strong gust of wind is one which satisfies at least one of the criteria explained above. For example, a loading-dependent blade adjustment of this kind in the coasting mode can initially be deactivated until a correspondingly strong gust of wind has occurred. In this case, it is possible to accept that a loading-dependent adjustment is not yet carried out in the coasting mode, or may be carried out only with a delay, in response to a first strong gust of wind of said kind. Burdensome gusts of wind of this kind can substantially shorten the service life of a wind turbine but usually cannot directly damage the wind turbine if they occur once. Therefore, it may suffice, after a strong gust of wind which subjects the wind turbine to loading, for only the further subsequent gusts of wind to be taken into account by the proposed adjustment of the rotor blades.

It is also possible for a gust of wind to be taken into account in respect of wind speed and wind direction in general with respect to the wind turbine, that is to say for the extent to which said gust of wind is distributed over the rotor surface which the rotor passes over during operation to not yet be taken into account. Therefore, a check is initially made for the wind turbine overall as to whether a gust of wind which subjects the wind turbine overall to severe loading is occurring and accordingly further gusts of wind of this kind are to be expected too. A load-relieving mode can then be activated. Here, the load-relieving mode is the mode in which at least one of the rotor blades, that is to say the rotor blades individually in respect of their blade angle, is adjusted such that a loading which is caused due to a gust of wind is reduced, in particular minimized. Therefore, the load-relieving mode is activated or deactivated for the wind turbine overall, but that, in the case of the activated load-relieving mode, the loading-reducing adjustment is carried out individually for each rotor blade.

Excessive operation of the adjustment drives for adjusting the rotor blades in respect of their angle of attack can be avoided by preliminarily checking whether a gust of wind which subjects the wind turbine to severe loading is occurring or can be expected at all.

Each rotor blade can preferably assume both greater and also smaller blade angles than the feathered position, specifically than the main feathered position, depending on the gust of wind detected. To date, it was customary to limit an adjustment of the rotor blade from its operating position in the partial-load mode, when the blade angle is approximately 0 degrees or a few degrees, up to the feathered position, which is generally approximately 90 degrees. Limiting of this kind was generally also prespecified by a mechanical switch which prevents excessive rotation of the rotor blade. Here, the invention now proposes dispensing with a switch of this kind and permitting rotation considerably beyond this 90-degree position, in particular permitting rotation beyond a 100° position. Said safety check which is intended to be eliminated in this way can instead be replaced by corresponding software, preferably by a redundant software check. A check of this kind preferably involves determining whether the load-relieving mode is activated or not. Accordingly, when the load-relieving mode is activated, excessive rotation of each rotor blade considerably beyond the main feathered position is permitted, whereas an adjustment of the rotor blade beyond the main feathered position of this kind can lead to a fault message or at least to a warning message when the load-relieving mode is deactivated.

Provided is a method for designing a wind turbine. A wind turbine comprising an aerodynamic rotor with rotor blades of which the blade angle can be adjusted, in which wind turbine the aerodynamic rotor or the nacelle supporting said rotor can be adjusted in respect of its azimuth direction, is likewise taken as a basis for this method. For this design, an expected reduced turbine loading for a once-every-50-years storm situation and/or a once-a-year storm situation is ascertained.

Said expected reduced turbine loading is based on a particular operating state in which the wind turbine is moved to a coasting mode specifically for self-protection purposes, the rotor is oriented in respect of its azimuth position into a low-loading orientation in relation to the wind, in which orientation the wind turbine is subjected to as little loading as possible by the wind from a main direction, and each rotor blade is adjusted in respect of a blade angle such that each rotor blade is in each case subjected to as little loading as possible by a gust of wind acting in the region of the rotor.

Accordingly, the wind turbine is designed for the expected reduced turbine loading ascertained in this way. In particular, it is assumed here that the wind turbine is operated as described above in accordance with at least one embodiment, that is to say that a low-loading operation is carried out by a load-relieving mode in particular. As a result, it is not only possible for the wind turbine overall to be subjected to little loading but it has been identified that this can also be taken into account when designing the wind turbine. It should be noted that it can be assumed that, in the case of a wind situation in which said once-every-50-years storm situation occurs, in particular when a so-called once-every-50-years gust of wind can be expected, the load-relieving mode was already activated. A storm situation of this kind itself develops over a certain time and until then said criteria for activating the load-relieving mode themselves are satisfied if said embodiment in which the load-relieving mode is activated only given certain situations is selected at all. The same applies for the once-a-year storm situation.

One embodiment proposes that ascertaining the expected reduced turbine loading is performed by means of a load simulation. A load simulation of this kind can examine the collective loading on the wind turbine and also take into account different wind situations. Said load simulation can also take into account a distribution of different wind situations, that is to say including different storm situations, as are to be expected at the intended site. Load simulations of this kind are known in principle and are carried out at regular intervals. This embodiment proposes, in particular, taking the described operation management using the described load-relieving mode as a basis for said load simulations. Therefore, the load simulation then takes into account the rotor blades being subjected to a correspondingly weaker loading by particularly unfavorable gusts of wind with oblique incident flow. Accordingly, a lower loading can be expected in this context. The load simulation can include this and as a result, in particular, a check can be made in respect of whether a more cost-effective design may then be a sufficient design.

In addition to or instead of a once-every-50-years storm situation, a once-a-year storm situation can also be taken into account. A once-a-year storm situation which therefore is to be expected once per year also constitutes a loading of the wind turbine which can have a critical influence on the design of the wind turbine. Therefore, the expected reduced turbine loading which is established on account of the use of a load-relieving mode is also taken into account for said once-a-year storm situation. Particularly for taking into account the overall loading, particularly the collective loads for the entire service life of the wind turbine which is taken as a basis, the invention proposes taking into account both the once-every-50-years storm situation and also the once-a-year storm situation.

Provided is a wind turbine which has an aerodynamic rotor with rotor blades of which the blade angle can be adjusted, wherein the aerodynamic rotor can be adjusted in respect of its azimuth direction. The wind turbine is set up for executing an operation method according to at least one embodiment described above for this purpose. In particular, a corresponding process computer is provided in the wind turbine for this purpose. Said steps can be programmed on said process computer.

In addition, the wind turbine has at least one load sensor, in particular at least two load sensors, on each rotor blade. Load sensors of this kind can be fitted to the blade root or else to a blade adapter which connects the rotor blade to the rotor hub. The loading sensors are preferably distributed around the rotor blade longitudinal axis, in particular two sensors which are arranged offset through 90 degrees in relation to one another are provided for each rotor blade. In this way, a loading on the rotor blade can also be detected in respect of the direction.

However, in principle, a single sensor per blade may also be sufficient. Said sensor is preferably arranged such that it detects a loading transverse to a chord of a profile of the rotor blade in the middle region.

The described load-relieving mode preferably operates such that a blade adjustment is performed such that a loading of the rotor blade in question is minimized. To this end, preferably only the measurement value of a single sensor is taken as a basis. It is also possible for a plurality of sensors to be used for this purpose, wherein, according to one proposal, the measurement values of both sensors are then combined to form a measurement value which can be fed back for the control arrangement. However, it should be noted that a loading of course acts on the rotor blade in every case when the wind blows, particularly when a stormy wind blows. Therefore, any loading on the rotor blade cannot be corrected to 0. However, in particular, loadings which occur transversely to the described chord of a profile of the rotor blade can change their mathematical sign depending on the direction of the attacking wind. In illustrative terms, the rotor blade can bend in two directions and one of these directions can be detected or taken into account as a positive loading and the other can be detected or taken into account as a negative loading.

The load-relieving mode then preferably operates such that the respective rotor blade is adjusted such that the rotor blade ideally does not bend at all. Often, adjustment of the respective rotor blade in the case of which bending phenomena of this kind have at least significantly reduced in comparison to non-adjustment is of course sufficient. Complete and permanent correction of such loadings, that is to say the illustratively described bending phenomena, to the value 0 will remain an ideal case which is hard to realize on account of the dynamically changing wind conditions. Nevertheless, a control specification of this kind can be formulated even when the ideal case is not achieved thereby.

BRIEF DESCRIPTION OF THE SEVERAL VIEWS OF THE DRAWINGS

The invention will be explained in more detail below by way of example using embodiments with reference to the accompanying figures.

DETAILED DESCRIPTION

Figure 1:
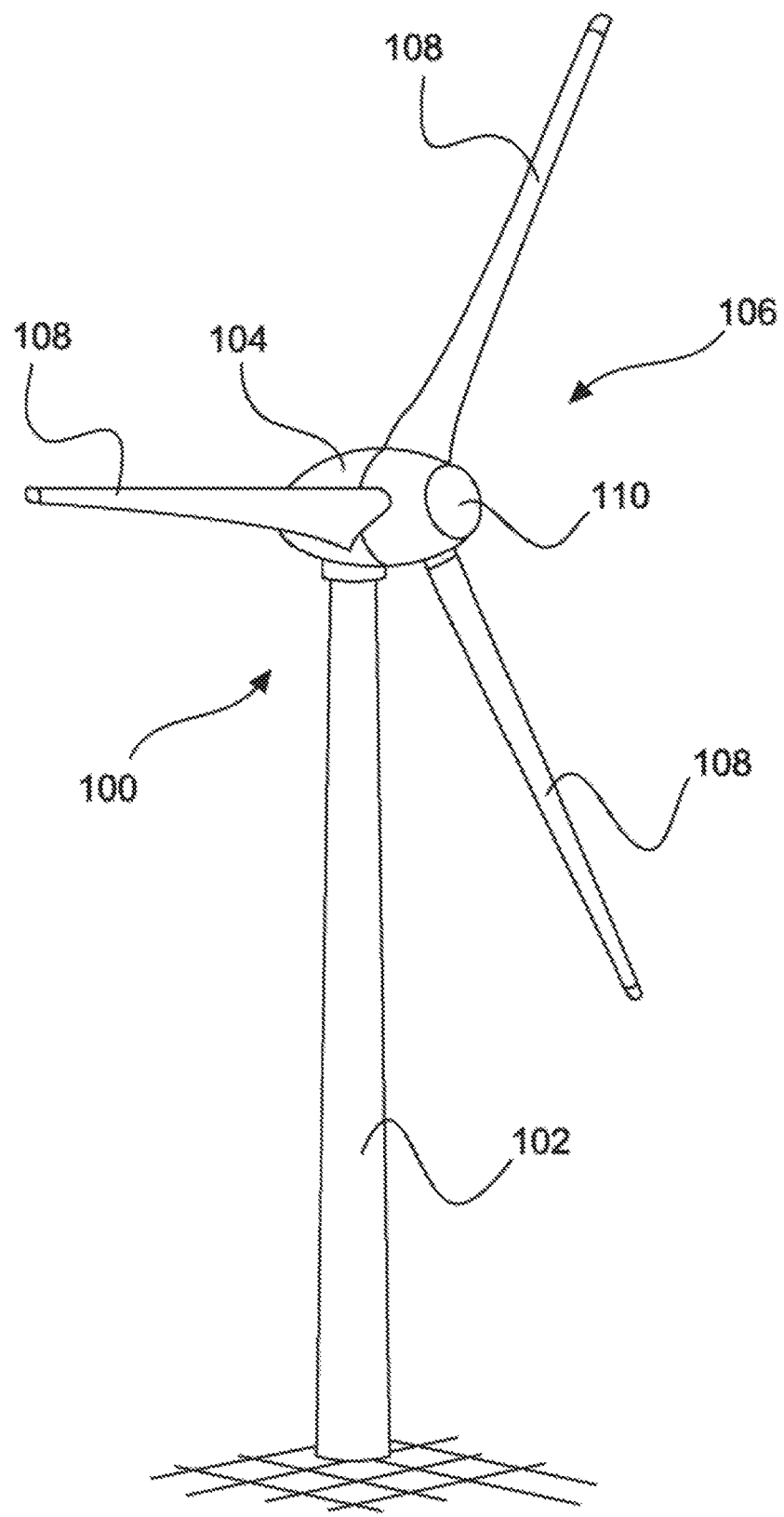
FIG. 1 shows a perspective illustration of a wind turbine.

FIG. 1 shows a wind turbine 100 having a tower 102 and a nacelle 104. A rotor 106 comprising three rotor blades 108 and a spinner 110 is arranged on the nacelle 104. The rotor 106 is made to execute a rotational movement by the wind during operation and thereby drives a generator in the nacelle 104.

Figure 2:
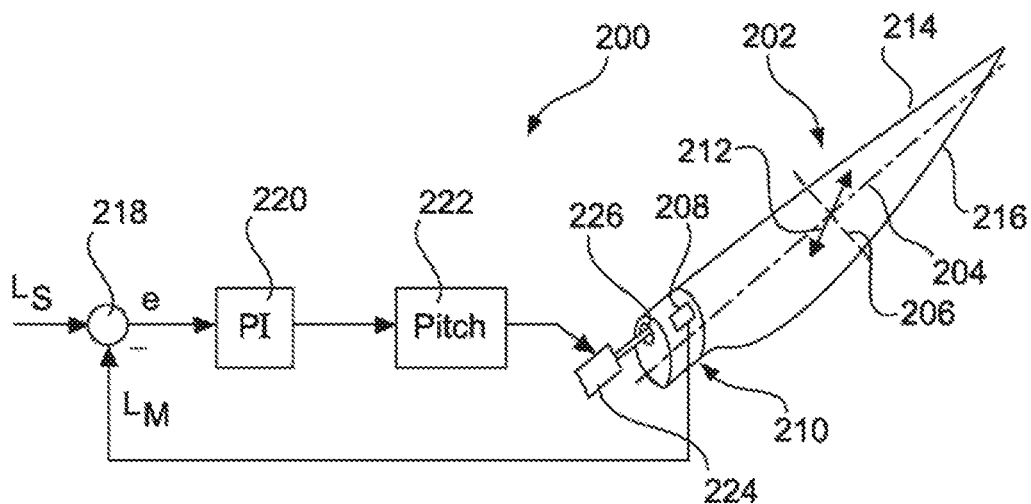
FIG. 2 schematically shows a control diagram for implementing the load-relieving mode.

FIG. 2 shows, in an illustrative manner, a control structure 200 which controls the blade angle of the likewise schematically illustrated rotor blade 202 for implementing a load-relieving mode. A rotor blade longitudinal axis 204 is schematically drawn as a dashed-and-dotted line in the rotor blade 202 and a chord 206 is drawn as a dashed line in a middle region of the rotor blade 202 likewise in a highly schematic manner. A load sensor 208 is likewise indicated in the root region 210 of the rotor blade 202.

The load sensor 208 is arranged, for instance, such that it receives a loading which also corresponds to a bending movement 212 of the rotor blade 202 substantially perpendicular to the chord 206. Therefore, here, said bending movement is a bending movement about an axis which runs substantially parallel to the chord 206. In other words, said bending movement is a bending movement or corresponding load direction for instance in the direction of an intake side to a delivery side or vice versa and not a direction between a front edge 214 and a rear edge 216. The intake side and delivery side cannot be very clearly illustrated in the schematic illustration of FIG. 2, and therefore reference is made to the front edge 214 and rear edge 216 for the purpose of drawing a distinction here.

A loading in a direction of this kind, that is to say which corresponds to the bending movement 212 according to the double-headed arrow drawn, is received by the load sensor 208. The load sensor 208 generates a corresponding load signal, this being illustrated here as $L_M$ and being subtracted from a load setpoint value $L_S$ at the summing point 218. The setpoint value $L_S$ can preferably have the value 0.

This setpoint value/actual value difference, which can also be denoted e, is then entered into the PI control block 220. A PI controller is proposed particularly so that a blade adjustment, which has led to a minimization of the loading and therefore of the load signal $L_M$, is maintained even when the control deviation e has the value 0. However, other controllers can also be used or a further component, such as a D component for example, can also be added for example in order to optionally influence the control dynamics.

The result of the PI control block 220 is then passed to the illustrative pitch block 222 which interacts with the likewise only schematically illustrated pitch drive 224. The pitch block 222 and the pitch drive 224 can form a blade adjustment device or a part thereof. The pitch drive 224 then carries out an adjustment of the blade angle by way of an indicated pinion 226, specifically a rotation essentially around the rotor blade longitudinal axis 204 if a corresponding adjustment signal has actually been generated by the PI control block 220.

Figure 3:
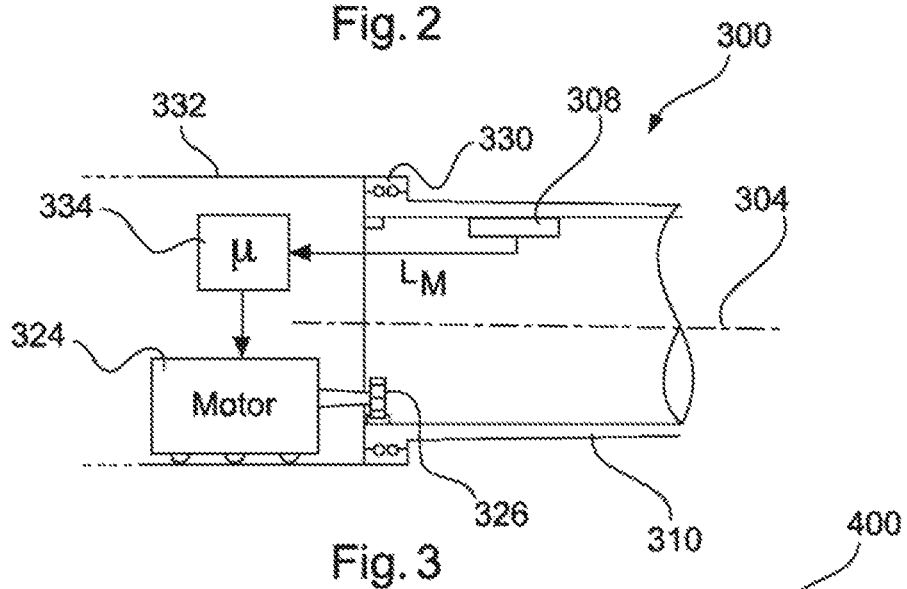
FIG. 3 schematically shows a basic outline of a detail of a blade connection region.

FIG. 3 illustrates, in the schematic sectional illustration of a rotor blade connection region 300, a possible structural arrangement of the schematic diagram of FIG. 2. The blade connection region 300 according to the illustration of FIG. 3 comprises a root region 310 of a rotor blade which could correspond to the rotor blade 202 of FIG. 2. Said root region 310 is rotatably mounted in a pitch bearing 330 in a hub section 332. The rotor blade longitudinal axis 304 is likewise drawn for illustration purposes.

In order to detect a loading, a load sensor 308 in the form of a strain gauge is drawn in an illustrative manner in the root region 310. The shown orders of magnitude of the elements, particularly of the load sensor 308, with the same applying for the load sensor 208 of FIG. 2 as well, do not have to correspond to actual orders of magnitude and have been selected substantially for the purpose of clear illustration.

The load sensor 308 can detect a load signal $L_M$ and transmit said load signal to a control apparatus 334. Here, the control apparatus 334 is illustrated as a microprocessor and can contain a part of the structure of FIG. 2, particularly the summing point 218 illustrated there and the PI control block 220. The pitch block 222 could also be part of the control apparatus 334.

The control apparatus 334 can then actuate the pitch drive 324, which is schematically illustrated as a motor here. Any adjustment specifications can then be implemented by means of a pinion 326 which is likewise merely indicated. An adjustment of the rotor blade angle by means of a mechanism other than by means of a pitch drive with a pinion is of course possible too. FIG. 3 illustrates that the control apparatus 334 can be arranged in the region of the rotor blade, particularly in the blade connection region 300. Therefore, a control apparatus 334 of this kind is also provided for each rotor blade and therefore a corresponding control operation, in particular implementation of the load-relieving mode, can be carried out for each rotor blade individually in a simple manner.

Figure 4:
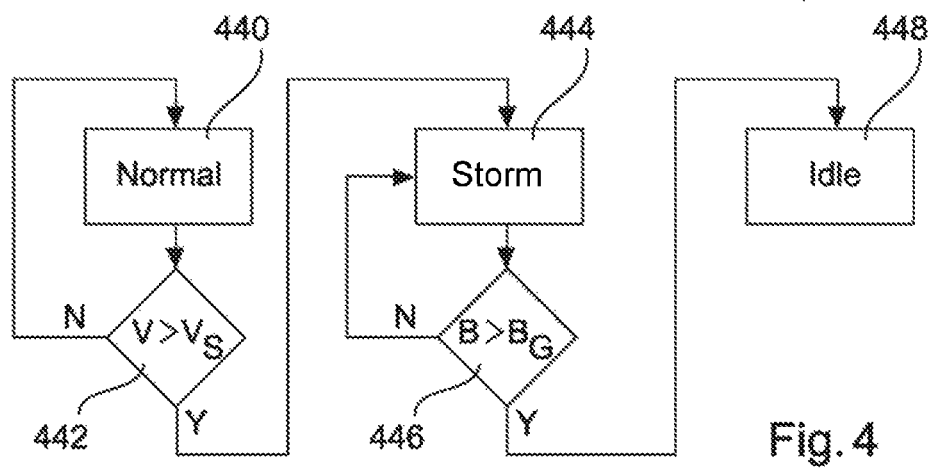
FIG. 4 shows a simplified flowchart particularly for activating a load-relieving mode.

The schematic process structure 400 of FIG. 4 proceeds, in principle, from a normal mode of the wind turbine. This is illustrated by the normal block 440. Starting from said normal block, a check is made in the storm checking block 442 as to whether the wind speed V is greater than a storm wind speed $V_S$. If this is not the case, the normal mode is continued and the process accordingly returns to the normal block 440.

However, if it is identified that the wind speed is correspondingly high, the operation management, which is also shown in this process structure 400 in this respect, moves to the storm operating mode which is illustrated by the storm block 444 here. It should be noted that this storm operating mode, which is illustrated by the storm block 444, does not refer to the storm situation in which the wind turbine is operated further at reduced power and/or reduced rotation speed but rather in which the wind turbine is not operated further and moves to a coasting mode. The management of the wind turbine in the coasting mode is therefore a characteristic of the storm situation under consideration here which is represented by the storm block 444.

Furthermore, according to the process structure 400, a check is then made in the gust of wind limit block 446 as to whether a gust of wind B is greater than a gust of wind limit $B_G$. This can mean that a wind speed of the gust of wind is compared with a predetermined limit wind speed of a gust of wind and/or a comparison of a wind speed increase in the gust of wind in relation to a prevailing average wind speed is performed with a predetermined limit value and/or that a wind direction of the gust of wind, which wind direction differs from the prevailing main wind direction, is observed and this wind direction deviation is compared with a predetermined wind direction deviation limit.

If the result of this comparison is that the gust of wind B is not greater than a gust of wind limit, the storm mode continues in a fundamentally unchanged manner. Therefore, the structure returns from the gust of wind limit block 446 to the storm block 444 in this situation.

However, if it has been identified in the gust of wind limit block 446 that a gust of wind is greater than a gust of wind limit, a load-relieving mode is additionally activated. This is represented by the idle block 448. In this load-relieving mode according to the idle block 448, a control operation is then activated, as is schematically shown in FIG. 2 for example. In other words, according to this process structure 400, said control operation according to FIG. 2 is activated only when this is triggered by the gust of wind limit block 446. Therefore, in the storm mode according to the storm block 444, the control operation according to FIG. 2 is preferably not yet active in the manner shown there.

It should be noted that the check according to the storm checking block 442 and also the check according to the gust of wind limit block 446 continue to be carried out. Therefore, the check according to the gust of wind limit block 446 also continues to be performed in the activated load-relieving mode 448 and accordingly the load-relieving mode may be deactivated again. A check according to the gust of wind limit block 446 is preferably then carried out such that the load-relieving mode is deactivated only when a situation in which the gust of wind B was not greater than the gust of wind limit $B_G$ has not occurred for a relatively long time, for example for a time of at least 10 minutes or for a time of at least one hour.

Similarly, a check in the sense of the storm checking block 442 can be performed in the storm mode and the process can optionally be returned to the normal mode.

The described invention relates particularly to the control of a wind turbine at high wind speeds. It is known that a wind turbine stops the normal production mode at high wind speeds and changes over to the coasting mode. In the process, the rotor blades, which can also be called blades for reasons of simplicity, are rotated out of the wind into a so-called feathered position so that said rotor blades do not draw any energy or draw only very little energy from the incident air. A turbine in the feathered position does not rotate or rotates only slightly. This is called coasting or the coasting mode here.

It has been found that, owing to the high level of turbulence in the wind, the situation that the wind or individual gusts of wind do not act on the turbine in an ideal manner from the front can arise in the process. Owing to these gusts of wind, the turbine is then no longer in the feathered position and energy is drawn from the wind. This drawn energy results in increased loads on the turbine.

The proposed solution makes provision here for the feathered position to be accordingly adapted by controlling the blade load signal by way of the load signal being adjusted to zero, particularly by means of a PI controller. This can be done separately or individually for all blades. The respectively optimal blade angle, which can differ significantly from the normal feathered position at 90°, is determined by the control operation.

The control operation therefore leads to sometimes severely reduced blade connection loads in storm conditions. The loads which occur in storm conditions can have a determinative effect on the dimensions, so that a load reduction may also result in potential cost reductions due to reduced component loads. Therefore, the design of the turbine can be influenced as a result of this or this can be taken into account at the design stage.

In addition to developing and implementing the proposed algorithm, one refinement also proposes adapting any blade angle stops. The blade angles, which can also be called pitch angles, are normally limited to values close to 90°. However, with the solution proposed now, pitch angles >90° can prove to be advantageous, so that structural changes to the blade adjustment system, which can contain a blade adjustment device and an angle monitoring arrangement, may be proposed.

It has also been found that gusts of wind which occur in storm conditions do not necessarily follow the main wind direction, and therefore these gusts of wind flow against the blades with a strong oblique incident flow. This generates more lift on the blade than the incident flow in the feathered position, and therefore results in higher blade loads.

To this end, a gust of wind identification arrangement is preferably implemented, this activating the load-relieving mode as required. This then particularly preferably adjusts the blade angle down to minimal blade impact loads with the aid of a PI controller. This leads to a correction of the blade angles deviating from the feathered position.

As a result, greatly reduced blade connection loads can be produced. These can also reduce the extreme loads. Load situations of this kind can also be determinative for the dimensions in turbines, and therefore a reduction of this kind can have a direct influence on the construction or be taken into account during the construction here.

The invention claimed is:

1. A method for operating a wind turbine, the wind turbine having an aerodynamic rotor with a rotor hub and a plurality of rotor blades with adjustable blade angles, wherein an azimuth position of the aerodynamic rotor is adjustable, the method comprising:
    detecting a storm situation in which a prevailing wind is so strong the wind turbine is moved to a coasting mode for self-protection purposes;
    orienting the azimuth position of the rotor into a low-loading orientation relative to the wind such that the wind turbine is subjected to as little loading as possible by the wind from a main wind direction;
    detecting at least one loading caused by a gust of wind acting on the rotor; and
    adjusting a blade angle of at least one of the plurality of rotor blades such that the at least one rotor blade is subjected to minimal loading by the causative gust of wind,
    wherein adjusting the at least one rotor blade is performed in response to the causative gust of wind having a wind speed that is greater than an average wind speed of the prevailing wind by a predetermined wind speed difference.

2. The method as claimed in claim 1, wherein adjusting comprises adjusting the at least one rotor blade depending on a detected blade loading, wherein the method further comprises entering the at least one loading detected into a load control arrangement, and wherein the load control arrangement adjusts the blade angle of the rotor blade depending on the detected loading such that the loading is minimized.

3. The method as claimed in claim 1, wherein:
at least one load sensor is provided on the rotor blade or in a region of a fastening of the rotor blade to the rotor hub for each rotor blade, and
a load signal is fed from the at least one load sensor to a control apparatus of the rotor blade to carry out the adjustment of the rotor blade angle.

4. The method as claimed in claim 1, further comprising:
moving the plurality of rotor blades to a feathered position; and
starting from the feathered position, adjusting the blade angle of each rotor blade individually about an angle deviation in relation to the feathered position.

5. The method as claimed in claim 1, wherein:
the causative gust of wind has a wind speed that is greater than a predetermined limit gust of wind speed, or
the causative gust of wind has a gust of wind direction that deviates from the main wind direction with respect to magnitude by a predetermined wind direction difference.

6. The method as claimed in claim 1, wherein the low-loading orientation is an orientation that faces the main wind direction.

7. The method as claimed in claim 1, wherein the gust of wind is detected with respect to wind speed and wind direction.

8. The method as claimed in claim 1, wherein each rotor blade of the plurality of rotor blades are configured to be adjusted to greater and smaller blade angles than a feathered position.

9. The method as claimed in claim 1, wherein a once-every-50-years storm situation or a once-a-year storm situation is taken into account prior to adjusting the blade angle.

10. A wind turbine configured to execute the method as claimed in claim 1.

11. A wind turbine comprising:
an aerodynamic rotor with a plurality of rotor blades, wherein the blade angles of the plurality of rotor blades are adjustable, wherein an azimuth position of the aerodynamic rotor is adjustable; and
a programmed process computer configured to execute a method comprising:
detecting a storm situation in which a prevailing wind is so strong that the wind turbine is moved to a coasting mode for self-protection purposes;
orienting the azimuth position of the rotor into a low-loading orientation relative to the wind such that wind on the wind turbine from a main wind direction is minimized;
detecting at least one gust of wind acting in a region of the aerodynamic rotor; and
in response to the at least one gust of wind having a wind speed that is greater than an average wind speed of the prevailing wind by a predetermined wind speed difference, adjusting a blade angle of at least one of the plurality of rotor blades in respect of its blade angle such that the at least one rotor blade is subjected to minimal loading by the gust of wind detected.

12. The wind turbine as claimed in claim 11 further comprising:
at least one load sensor on the at least one rotor blade or in a region of a fastening of the rotor blade to a rotor hub for the at least one rotor blade,
a control apparatus, and
a signal transmission device configured to feed back a load signal from the at least one load sensor to the control apparatus to cause the adjustment of the at least one rotor blade depending on the load signal to minimize or at least to reduce a loading that is detected by the load signal.

13. The wind turbine as claimed in claim 12, further comprising:
blade adjustment devices coupled to the plurality of rotor blades, the blade adjustment devices being configured to adjust the blade angle of the respective rotor blade, and
control apparatuses coupled to the plurality of rotor blades, the control apparatuses being configured to implement the adjustment of the blade angle of the at least one rotor blade, wherein the control apparatus is configured to receive the load signal from the at least one load sensor and to control the respective blade adjustment device depending on the signal to implement the adjustment of the at least one blade angle to minimize or at least to reduce the loading that is detected by the load signal.

* * * * *